Sept. 22, 1970 R. D. BERRYMAN ET AL 3,530,254

EXECUTIVE CONFERENCING SYSTEM

Filed Aug. 1, 1968 8 Sheets-Sheet 1

INVENTORS R. D. BERRYMAN
J. R. McEOWEN
G. E. SALTUS

BY D. E. Snedeker
ATTORNEY

Sept. 22, 1970 R. D. BERRYMAN ET AL 3,530,254

EXECUTIVE CONFERENCING SYSTEM

Filed Aug. 1, 1968 8 Sheets-Sheet 3

EXECUTIVE CONFERENCING SYSTEM

Sept. 22, 1970 R. D. BERRYMAN ET AL 3,530,254

EXECUTIVE CONFERENCING SYSTEM

Filed Aug. 1, 1968 8 Sheets-Sheet 5

EXECUTIVE CONFERENCING SYSTEM

Filed Aug. 1, 1968 8 Sheets-Sheet 6

United States Patent Office 3,530,254
Patented Sept. 22, 1970

3,530,254
EXECUTIVE CONFERENCING SYSTEM

Robert D. Berryman, Red Bank, James R. McEowen, Madison Township, Middlesex County, and George E. Saltus, Colts Neck, N.J., assignors to Bell Telephone Laboratories, Incorporated, Murray Hill and Berkeley Heights, N.J., a corporation of New York Filed Aug. 1, 1968, Ser. No. 749,366
Int. Cl. H04m 3/56
U.S. Cl. 179—18 13 Claims

ABSTRACT OF THE DISCLOSURE

An executive conferencing arrangement for use in a key telephone system provides establishment of a conference call under control of the master station set by sequentially operating a conference key and the respective selection keys associated with the individual stations with which the conference is desired. Additional parties may be subsequently added on to the conference, or existing parties may be dropped off, by simply operating the selection keys associated therewith at the master station set. The master station set can consult privately with one of the conference parties or with another station set over a private link while holding the conference call.

BACKGROUND OF THE INVENTION

This invention relates to an executive conferencing arrangement for a telephone switching system.

There are numerous arrangements in the telephone art directed toward conferencing and toward setting up conference calls. Typically, prior arrangements have been limited in their application to specific switching systems and have been limited in the flexibility and control provided to the station establishing the conference call. For example, some known arrangements are convenient in that they provide for the establishment of a conference call automatically in response to the dialing of a certain code, but the conference is established between a predetermined group of stations without any control over the selection of stations for a conference. Other known arrangements provide for the selection of particular stations for a conference call but are somewhat inconvenient in that they require dialing a conference code or flashing the switch hook preceding the dialing of each station number.

Moreover, it is somewhat difficult or impossible in known conferencing arrangements to add additional stations to an established conference call, and individual stations can be removed from the conference only by asking the individual stations to hang up. None of the prior conferencing arrangements thus have been found to be sufficiently flexible or to provide the control and simplicity of operation desired for use, for example, by executives for rapid conferencing with selected members of their supporting staff organization.

In addition to the above limitations of existing conferencing arrangements, it is becoming increasingly apparent that the requirements of many executives include other service features which have not been provided heretofore. Thus, for example, an executive's master station should be able to consult privately with one of the stations connected to a conference, or with another station, while holding the conference call. Further, control of the conference should be provided readily to more than one master station, such as at different office locations, if desired.

SUMMARY OF THE INVENTION

It is therefore an object of this invention to provide an improved and relatively simple conferencing arrangement in which a conference call can be established quickly and conveniently under the complete control of one or more master stations.

It is a further object of this invention to provide an improved conferencing arrangement in which additional stations can be added readily to a conference call at any time under the control of a master station.

Another object of this invention is to provide an improved conferencing arrangement in which individual stations can be dropped readily from a conference call at any time under control of a master station.

Yet another object of this invention is to provide an improved conferencing arrangement in which a master station controlling a conference call can consult privately with one of the conference stations or with another station while holding the conference call.

Still another object of this invention is to provide an improved conferencing arrangement for providing complete conferencing control to a plurality of master stations for establishing a conference call and for selectively adding or dropping individual conference stations at any time.

These and other objects of the present invention are attained in an illustrative embodiment of a telephone conferencing arrangement for providing complete conferencing control to one or more master stations via the operation of key pushbuttons at the master stations. In particular, a master station, such as a thirty-key CALL DIRECTOR® set, is provided with a conference key, a hold key and a plurality of station selection keys. A call connection is established betwen a master station and another station in the usual manner by operation of the station selection key associated with the particular station. A conference call is established with similar facility by operation of the conference key, followed by operation of selected ones of the station selection keys, the master station and the selected stations being thereby interconnected through a switching network and conference bridge circuit.

In accordance with one aspect of the invention, additional stations can be added to the conference call at any time, up to the total capacity of the conference bridge circuit, by simply operating the station selection keys associated with the additional stations. According to a further aspect of the invention, assuming the use of nonlocking station selection keys, individual ones of the conference stations can be dropped from the conference call under control of a master station by a second operation of the associated station selection keys. Thus, during a conference call the first operation of a particular station selection key effects connection of the associated station to the conference. A second operation of the particular station selection key effects disconnect of the associated station from the conference.

In accordance with another aspect of the invention a conference call can be held by operation of the hold key at a master station, permitting the conference stations to continue the conference while the master station consults privately wtih another station or with one of the conference stations over a private connection link. When a conference call is placed on HOLD by a master station, connection of the master station with an individual station for consultation over the private link is effected automatically by operation of the particular station selection key associated with the individual station. If the individual station is connected to the conference, the operation of the associated station selection key effects disconnect of the station from the conference and the key is operated again to connect the station to the master station over the private link.

BRIEF DESCRIPTION OF THE DRAWING

The above and other objects and features of the invention may be fully apprehended from the following detailed description, taken in conjunction with the accompanying drawing in which.

GENERAL DESCRIPTION OF THE INVENTION

Figures 1, 9:
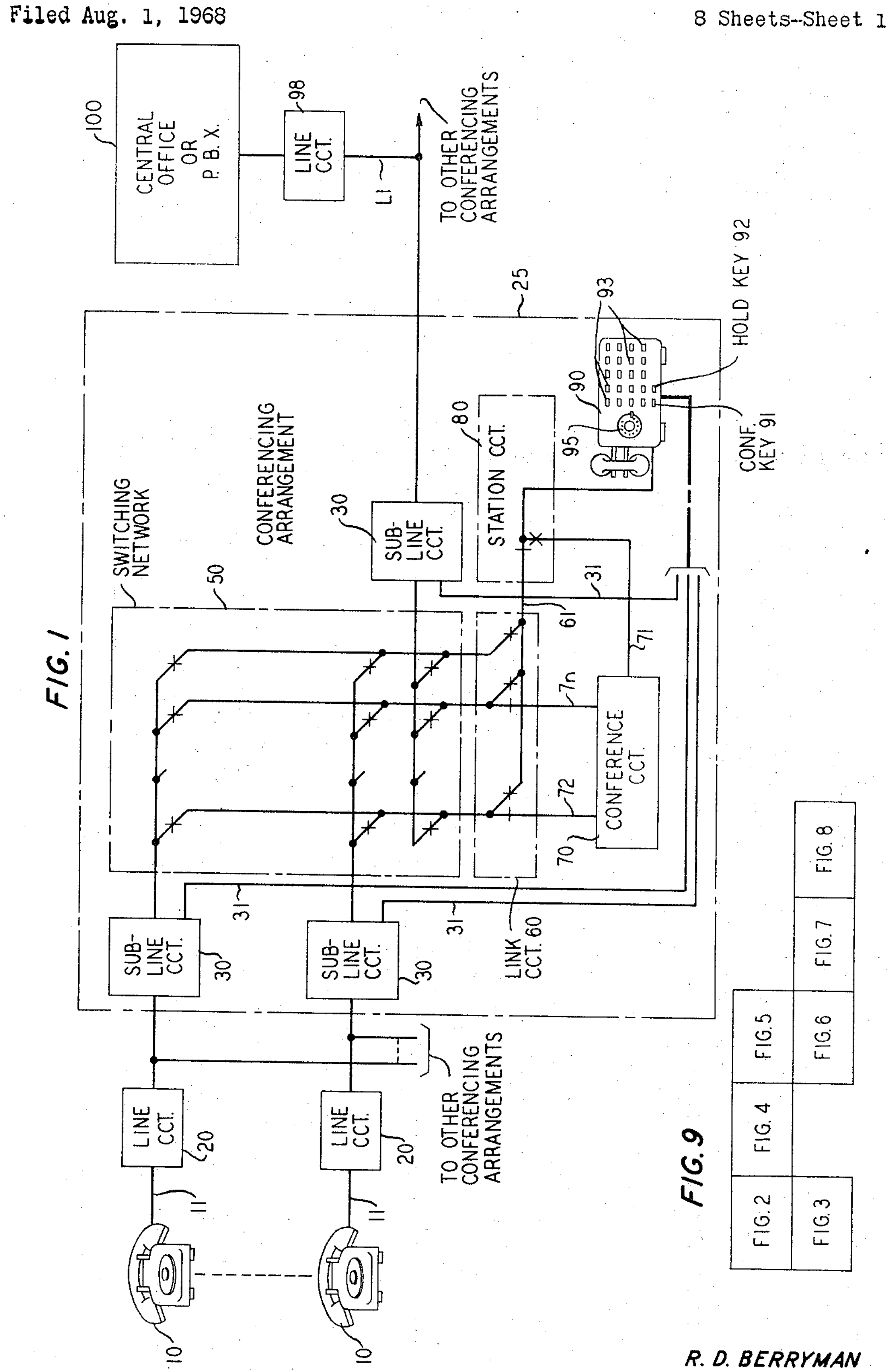
FIG. 1 is a block diagram showing the major functional components included in an illustrative telephone conferencing arrangement embodying the principles of the present invention.

The functional block diagram representation in FIG. 1 of an illustrative telephone conferencing arrangement 25, in accordance with the principles of our invention, comprises a multi-key master subscriber station set 90 which is selectively connectable through switching network 50 to individual ones of a plurality of subscriber station sets 10 or to a telephone terminal 100, such as a central office or PBX. According to our invention, master station set 90 is also selectively connectable through conference circuit 70 and switching network 50 to selected plurality of station sets 10 for conferencing. For the purposes of describing the invention, only a single conferencing arrangement 25 and master station set 90 have been shown for controlling conferencing. However, it will be appreciated from FIG. 1 and from the description hereinbelow that a plurality of such conferencing arrangements 25 and associated master station sets 90 could be provided for controlling conferencing with station sets 10 from several different locations.

Station sets 10 and central office or PBX 100 are connected to the one or more conferencing arrangements 25 via individual telephone lines including respective line circuits, such as line circuits 20 and 98, the line circuits providing the usual talking path supervision and providing control of visual and audible signaling. Each station set 10 is shown in FIG. 1 as connected to conferencing arrangement 25 on a single private line basis. However, the individual station sets may be provided with one or more line selection keys to permit connection of the station set to other lines, as depicted illustratively in FIG. 2.

Master station set 90 in conferencing arrangement 25 includes a dialing mechanism, illustratively shown as rotary dial 95, and a plurality of illuminated keys or pushbuttons associated with the different service features available at the set, such as conference key 91, hold key 92 and selection keys 93. Selection keys 93 include individual station selection keys respectively associated with the individual telephone lines 11 to subscriber station sets 10, and keys 93 also include one or more line selection keys for selecting associated lines to central office or PBX 100, such as line L1 in FIG. 1. The individual keys are illuminated, as is well known in the key telephone art, to provide, for example, a flashing signal when an associated line is ringing, a winking signal when the line is on HOLD, and a steady signal when the line is busy. As will be apparent from the description herein, keys 91, 92 and 93 may be either locking or nonlocking in accordance with our invention, and they are typically mechanically and electrically interlocked to prevent operation of more than one key at a time.

Conferencing arrangement 25 also includes a respective subline circuit 30 associated with each line connected to the conferencing arrangement. Subline circuits 30 receive the station selection key signals from master station set 90 over respective control paths 31 and provide access to switching network 50. Switching network 50, in turn, is a crosspoint connection network for selectively connecting individual ones of station sets 10 through link circuit 60 and station circuit 80 to master station 90, or through link circuit 60 to conference circuit 70. Station circuit 80 functions to transfer the talking path connection of master station set 90 from link circuit 60 to conference circuit 70 when conference key 91 is operated and further provides the logic circuitry for controlling conferencing arrangement 25.

Conference circuit 70 is a conventional multiport bridge, each port comprising a talking path, and is arranged such that voice frequency signals originating in any one of the ports is conveyed or transmitted to all other ports. One of the ports, such as port 71, is extended through station circuit 80 to master station set 90 and the remaining ports 72 through 7$n$ are connected through link circuit 60 to switching network 50.

A call is initiated from master station set 90 to one of subscriber station sets 10 by going off-hook and operating the particular station selection key 93 associated with the telephone line to the one subscriber station set. Station circuit 80 is responsive thereto to cause link circuit 60 to connect set 90 over private link 61 to switching network 60. At the same time the particular subline circuit 30 associated with the line corresponding to the operated station selection key 93, responsive to a signal over its control path 31 from set 90, extends a signal to switch-network 50. At the same time the particular subline circonnect the line therethrough to private link 61. Upon completion of the call connection in this manner, ringing is extended to the subscriber station set by the associated line circuit 20 to provide audible signaling, and visual signaling if the station set is a multiple line set, in the usual manner.

A conference call is initiated from master station set 90 in a similar manner to selected ones of station sets 10, according to our invention, by going off-hook, operating conference key 91, and then operating the particular station selection keys 93 associated with the selected station sets 10. Station circuit 80 responds to the operation of conference key 91 to connect master station set 90 to port 71 of conference circuit 70. The subline circuits 30 associated with the lines corresponding to the operated station selection keys 93 each extend signals to switching network 50 operating appropriate crosspoints, in conjunction with link circuit 60, to connect the respective lines to appropriate ones of ports 72 through 7$n$ of conference circuit 70.

Subsequently, additional ones of station sets 10 can be added to the conference at any time, up to the total capacity of conference circuit 70, by simply operating the particular station selection keys 93 associated with the additional station sets. Responsive thereto, the corresponding subline circuits 30, in conjunction with link circuit 60, connect the additional station sets through switching network 50 to idle ones of ports 72 through 7$n$ of conference circuit 70.

Once a station set 10 is connected to the conference via one of ports 72 through 7$n$, it can be individually dropped from the conference without disturbing the remaining conference connections by operating the associated station selection key 93 a second time. Subline circuit 30 associated with the station to be dropped responds to this second operation of the station selection key to cause switching network 50 to disconnect the particular station set from conference circuit 70. Alternatively, of course, the entire conference call connection can be dropped by operation of conference key 91 a second time or by master station set 90 going on-hook, thereby causing switching network 50 to disconnect all of station sets 10 from conference circuit 70. At the same time, station circuit 80 disconnects master station set 90 from conference circuit 70.

If, on the other hand, master station set 90 wishes to place the conference call on HOLD, this is effected by operation of hold key 92. When hold key 92 is operated, station circuit 80 disconnects station set 90 from conference circuit 70. The connection between the conferenced station sets 10 is continued by conference circuit 70, permitting them to continue the conference while the conference call is held. Master station set 90 can then proceed to consult privately with another station set, if desired, via private link 61. For example, if master station set 90 wishes to consult with one of station sets 10, operation of the corresponding station selection key 93 effects interconnection of the particular station set 10 and station set 90 over link 61 in the above-described manner. If the particular station set 10 is one of the sets connected to the conference, operation of the associated station selection key effects disconnect of the station set from the conference and operation of the selection key again automatically connects the station set to master station set 90 over private link 61.

A number of advantages arise from a conferencing arrangement such as shown in FIG. 1. The master station set is provided with greater and more complete conferencing control than heretofore available with known conferencing arrangements. This control can be effected rapidly and simply by the master station set without the need for complex rules or sequences of operation being required by the operator at the master station set. Additional station sets can be "instantly" added to a conference at any time, and individual station sets can be selectively dropped from the conference at any time, entirely under the control of the master station set. Further, the master station set can hold a conference call and consult privately with one of the conference stations or with another station over a private link. A more complete and comprehensive description of a specific illustrative embodiment, in accordance with the principles of the present invention, will be found hereinbelow in the detailed description of the block diagram shown in FIGS. 2 through 8, arranged as indicated in FIG. 9.

DETAILED DESCRIPTION OF THE INVENTION

Figure 2:
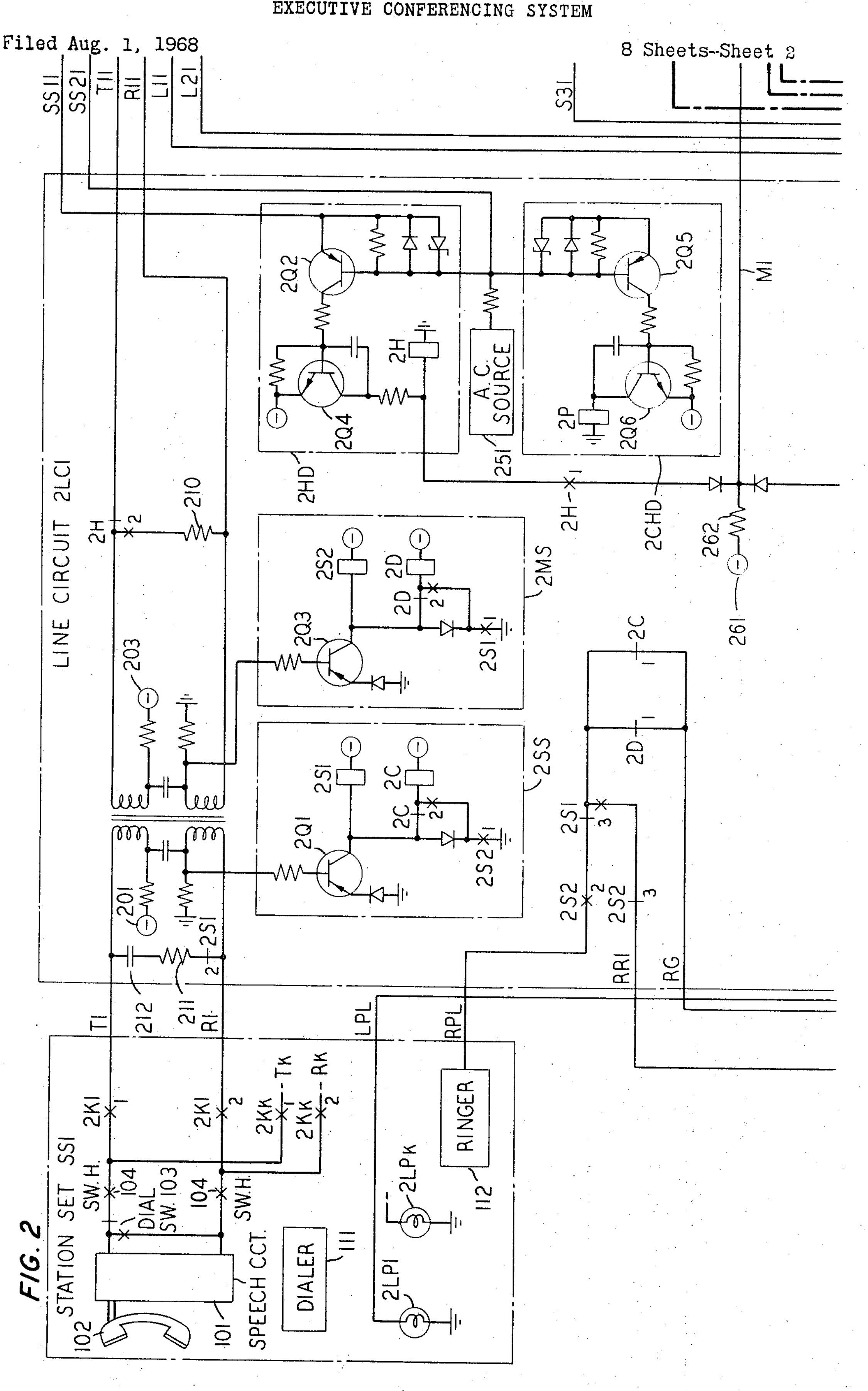
FIGS. 2 through 8, when arranged as indicated in FIG. 9, comprise an additional block diagram of a specific illustrative embodiment of a conferencing arrangement according to our invention showing portions thereof in greater detail.
Figure 3:
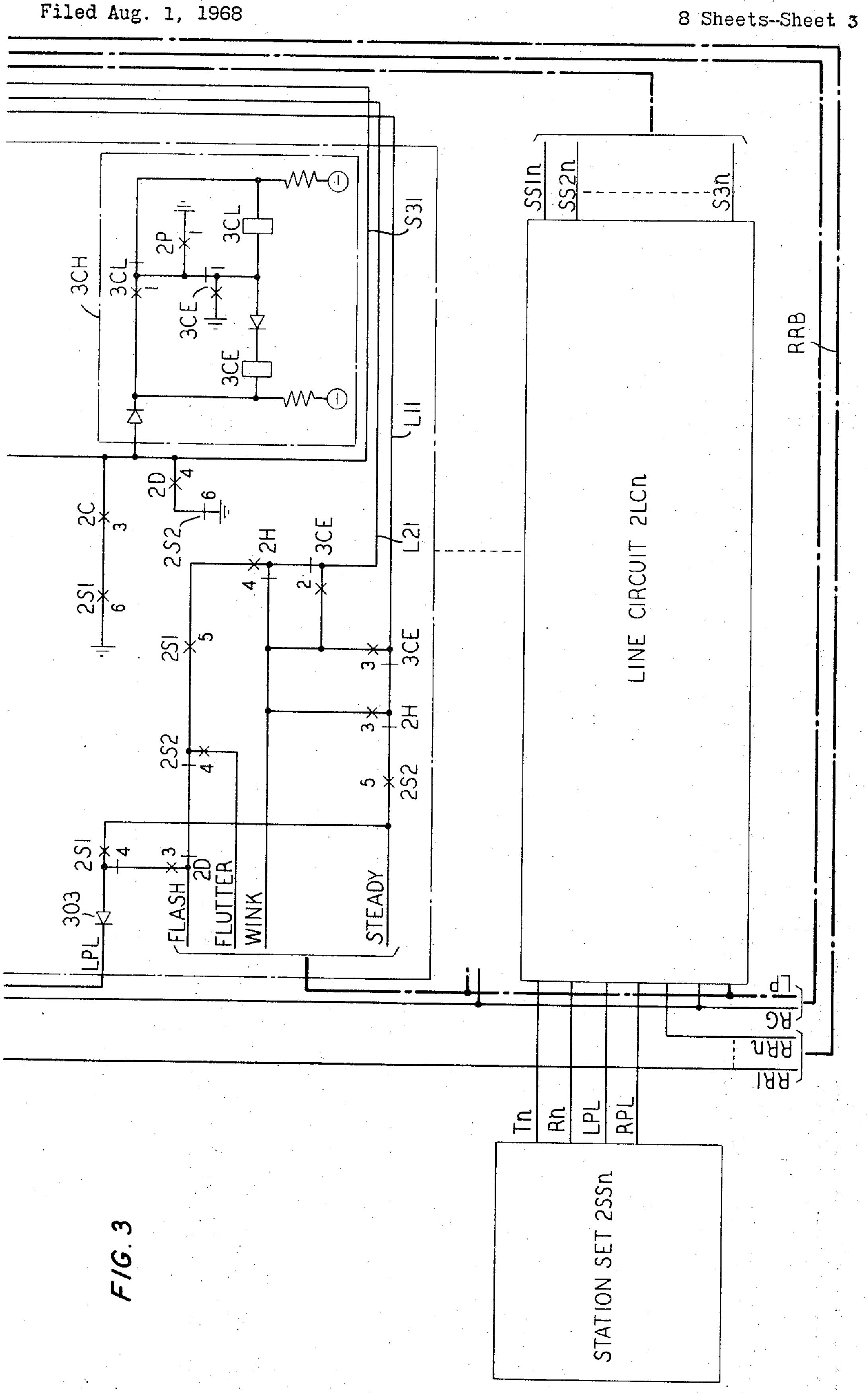
Figure 4:
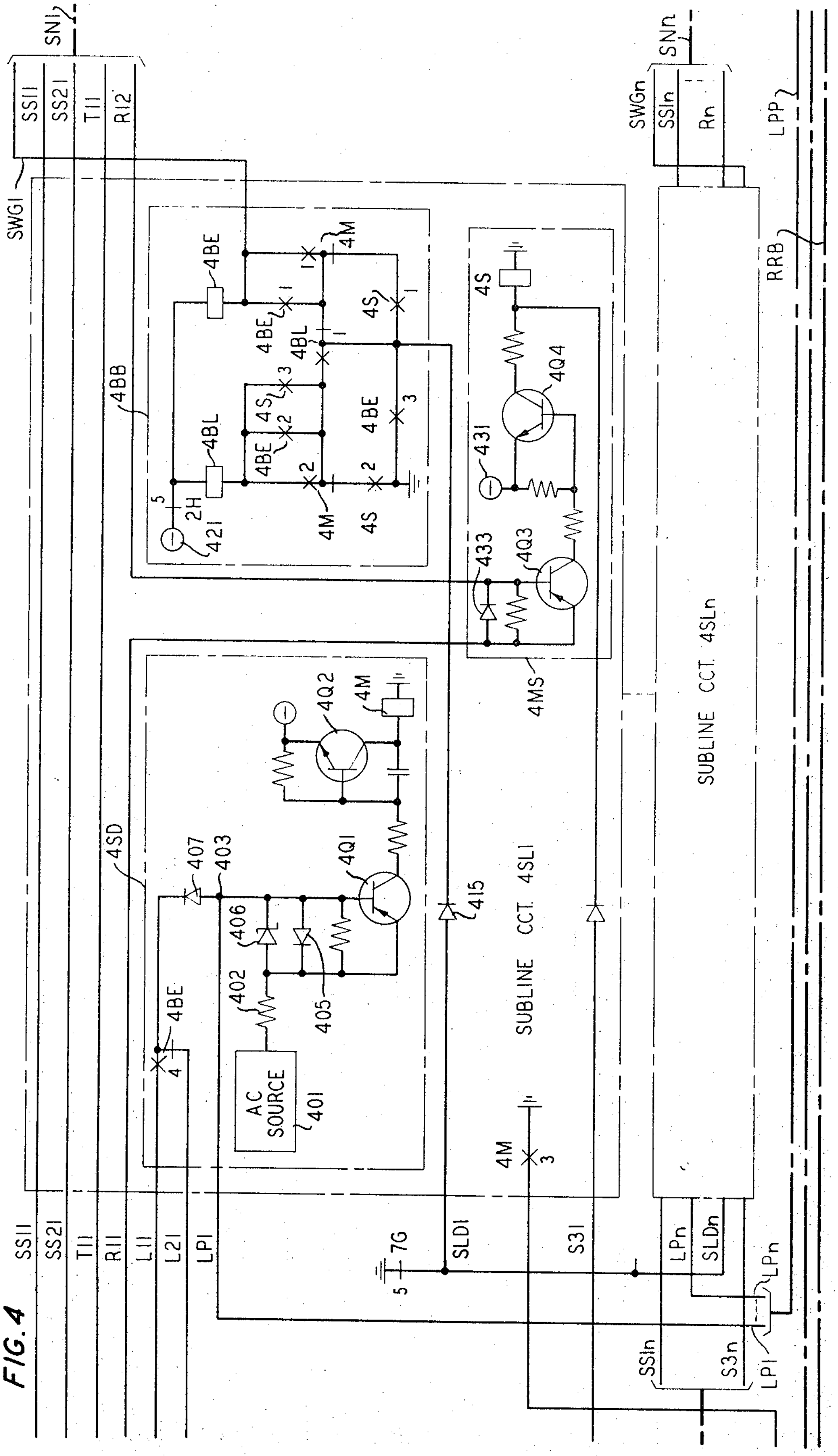
Figure 5:
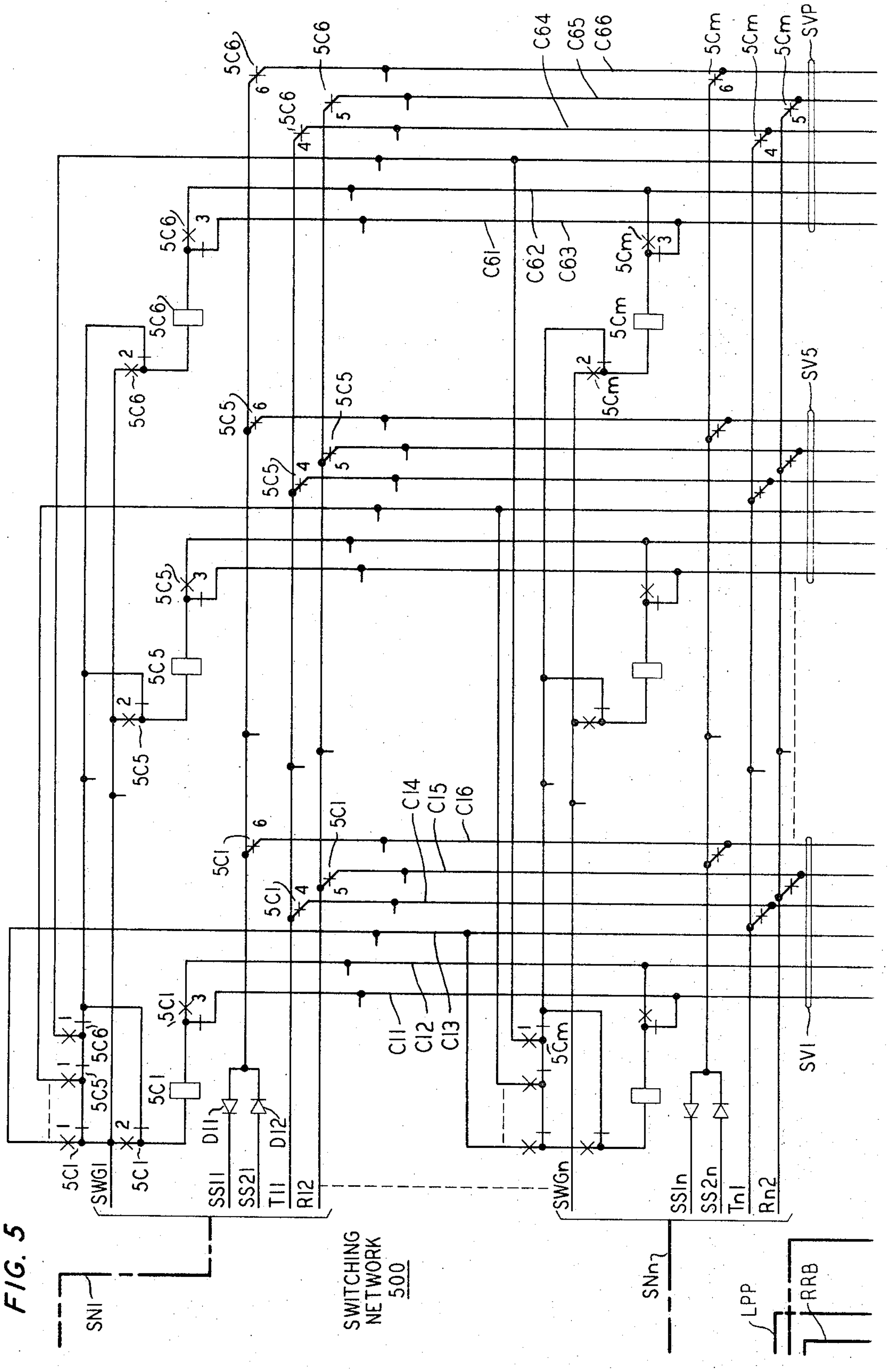
Figure 6:
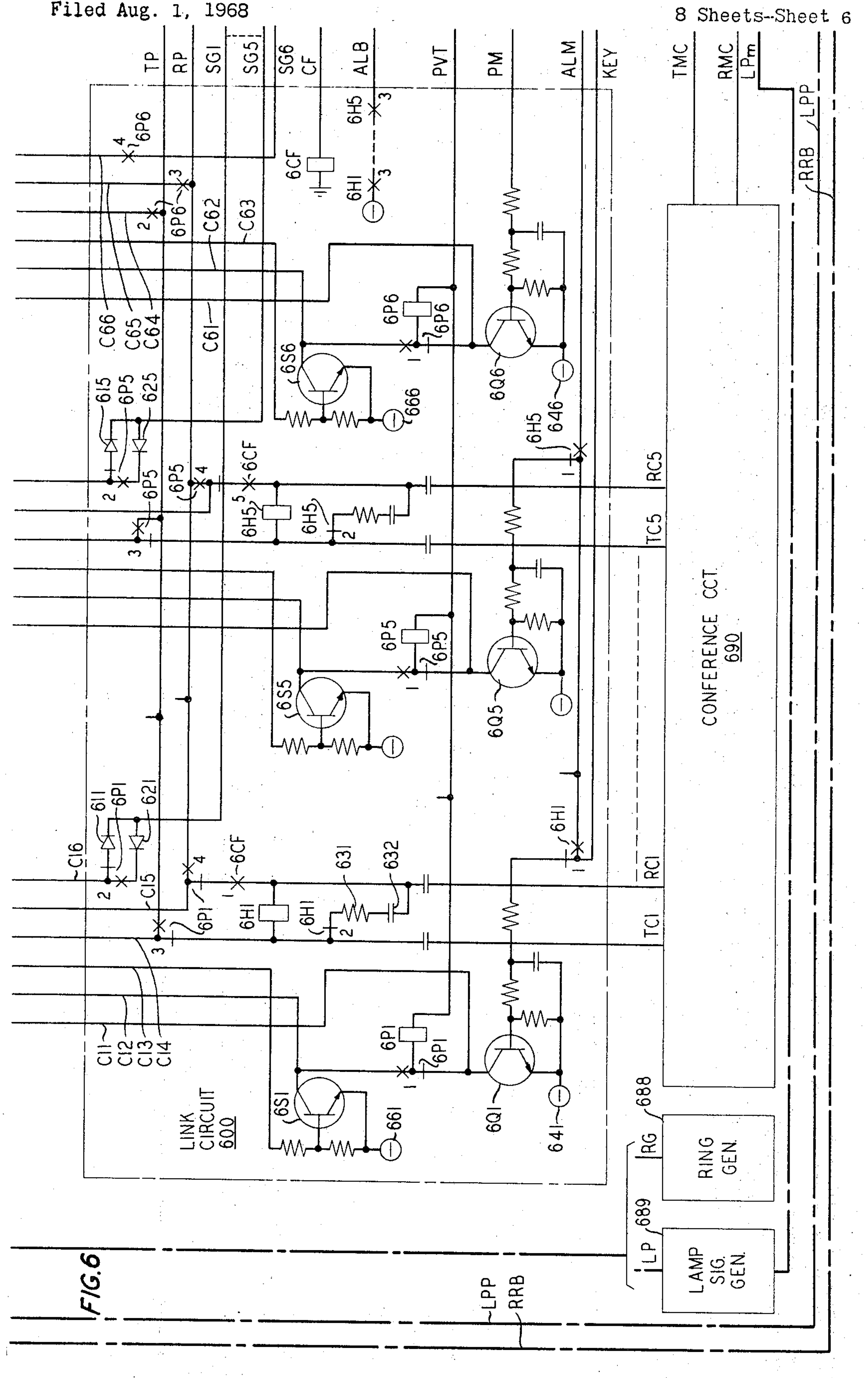
Figure 7:
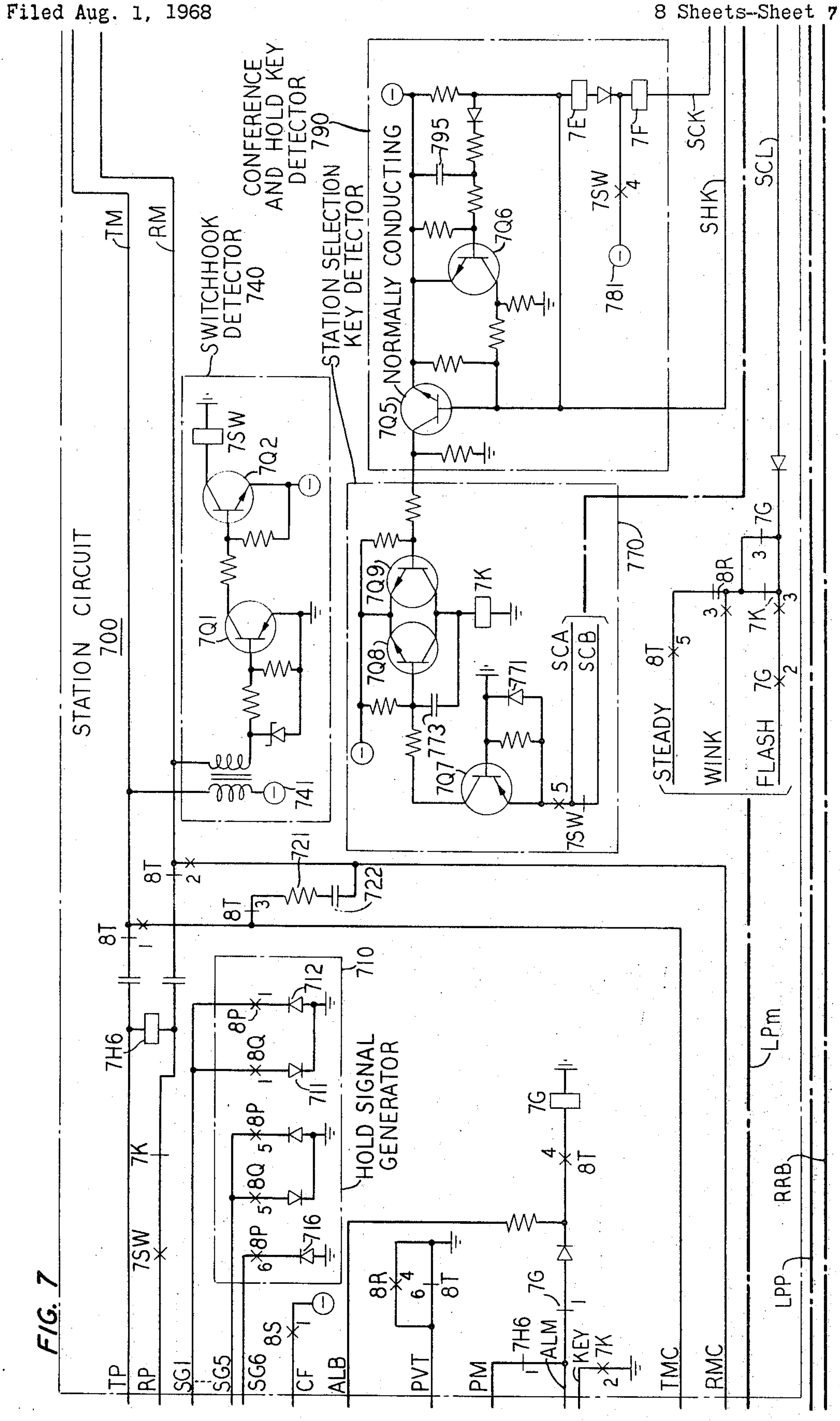

In FIGS. 2 through 8, portions of an illustrative embodiment of a telephone system employing a conferencing arrangement according to our invention are shown in greater detail. Specifically, a plurality of subscriber station sets 2SS1 through 2SS*n* and accompanying line circuits 2LC1 through 2LC*n* are shown in FIGS. 2 and 3. Station set 2SS1 is illustratively depicted in detail in FIG. 2 as a multiple key station set. The other station sets are assumed to be substantially similar to station set 2SS1 except that the number of keys provided may vary from set to set. Subline circuits 4SL1 through 4SL*n*, respectively associated with station sets 2SS1 through 2SS*n*, are shown in FIG. 4. Switching network 500 is shown in detail in FIG. 5, and link circuit 600 and conference circuit 690 are shown in FIG. 6. The conferencing arrangement is controlled, as described above, by station circuit 700 and master station set 800, shown in detail in FIGS. 7 and 8.

Each station set, it will be recalled, is connected over a respective talking path through an associated line circuit and subline circuit to a switching network, such as switching network 500 in FIG. 5. The individual talking path for each station set illustratively includes a set of tip and ring conductors, such as conductors T1 and R1 for station set 2SS1. The tip and ring conductors T1 and R1 terminate at set 2SS1 in a conventional speech circuit 101 and handset 102. Shown in FIG. 2, tip and ring conductors T1 and R1 also include dial switch 103, a pair of switch hook contacts 104 and contacts 1 and 2, respectively, of line selection or pickup key 2K1. Switch hook contacts 104 are normally open, indicative of an on-hook condition, and contacts 104 close in conventional fashion when handset 102 is lifted from its cradle to go off-hook. Dial switch 103 is a transfer contact pair which operate repetitively in a conventional fashion during dialing operation by dialer 111, assumed illustratively to be a rotary dial.

Station set 2SS1 comprises a plurality of conventional line selection or pickup keys 2K1 through 2K*k*, respective contacts 1 and 2 of which are shown in FIG. 2. Keys 2K1 through 2K*k* individually provide for the selection of predetermined ones of the lines available at set 2SS1, such as the line including conductors T1 and R1 which is selected by operation of key 2K1 or the line including conductors TK and RK selected by key 2K*k*. In the audio and visual signaling portion of station set 2SS1, a ringer 112 is provided along with lamps 2LP1 through 2LP*k*. Lamps 2LP1 through 2LP*k* are respectively associated with line pickup keys 2K1 through 2K*k*, and thus lamp 2LP1 corresponds to the line including tip and ring conductors T1 and R1.

Station sets 2SS1 through 2SS*n* are each connected to a respective line circuit 2LC1 through 2LC*n* and therethrough to a respective subline circuit 4SL1 through 4SL*n*. The several line circuits are connected in common over leads RG and LP to ring generator 688 and lamp signal generator 689, respectively. Line circuit 2LC1 associated with station set 2SS1, and each of the other line circuits, comprises, in addition to the talking path circuitry, station set supervision circuit 2SS, master set supervsion circuit 2MS, hold detector 2HD, conference hold detector 2CHD, conference hold flip-flop 3CH and circuitry for controlling the lamp and ringing signals to the individual station set. Supervision circuits 2SS and 2MS each include transistor current detectors for detecting loop current in respective portions of the talking path to initiate ringing and visual signaling of station set 2SS1 or master station set 800, respectively, in the manner described below. Detectors 2HD and 2CHD similarly include transistor current detectors to detect, respectively, hold and conference hold conditions over leads SS11 and SS21. Detection of a hold condition over lead SS11 operates hold relay 2H to alter the corresponding master station set lamp signal, to connect holding bridge resistor 210 across the station set talking path, and to disconnect the station set from switching network 500. Detection of a conference hold condition over lead SS21 operates relay 2P, setting conference hold flip-flop 3CH to alter the corresponding master station set lamp signal.

Subline circuit 4SL1 associated with station set 2SS1, and each of the other subline circuits, comprises a station detector 4SD to detect operation of a corresponding station selection key at master station set 800, a station key flip-flop 4BB to provide for nonlocking station selection key operation, and a supervisory circuit 4MS. Each subline circuit 4SL1 through 4SL*n* is connected to master station set 800 over a respective one of leads LP1 through LP*n*.

Turning now to the circuitry common to the station sets 2SS1 through 2SS*n*, switching network 500 thereof is a crosspoint switching array including crosspoint relays 5C1 through 5C*m* where *m* is equal to *n* multiplied by the total number of ports available in conference circuit 690, illustratively assumed to be six ports. Contacts 1, 2 and 3 of each crosspoint relay 5C1 through 5C*m* perform logical switching and the remaining contacts of each crosspoint relay perform talking path and signaling path switching. Horizontal links SN1 through SN*n* of switching network 500 are each connected to a respective one of subline circuits 4SL1 through 4SL*n* and thus are each associated with a respective one of station sets 2SS1 through 2SS*n*. Vertical links SV1 through SV5 and SVP are connected to link circuit 600. Switching network 500 operates in an end marked scheme, depression of a station selection key at master station set 800 causing the corresponding subline circuit to extend ground to switching network 500 over the horizontal link connected to the particular subline circuit. At the same time, an energization potential signal is provided by link circuit 600, under control of station circuit 700, over an idle vertical link to network 500, thereby operating a single crosspoint relay at the intersection of the energized vertical link and the grounded horizontal link. Operation of a particular crosspoint relay disables all other crosspoint relays in that horizontal link group and busies the particular vertical link.

Link circuit 600 includes a plurality of relays 6H1 through 6H5 to select idle ones of vertical links SV1 through SV5 for connection to conference circuit 690 and to provide dummy load terminations for unused ports of conference circuit 690. Relays 6P1 through 6P6 are provided for connecting individual ones of vertical links SV1 through SV5 and SVP to the private link comprising tip and ring conductors TP and RP.

Figure 8:
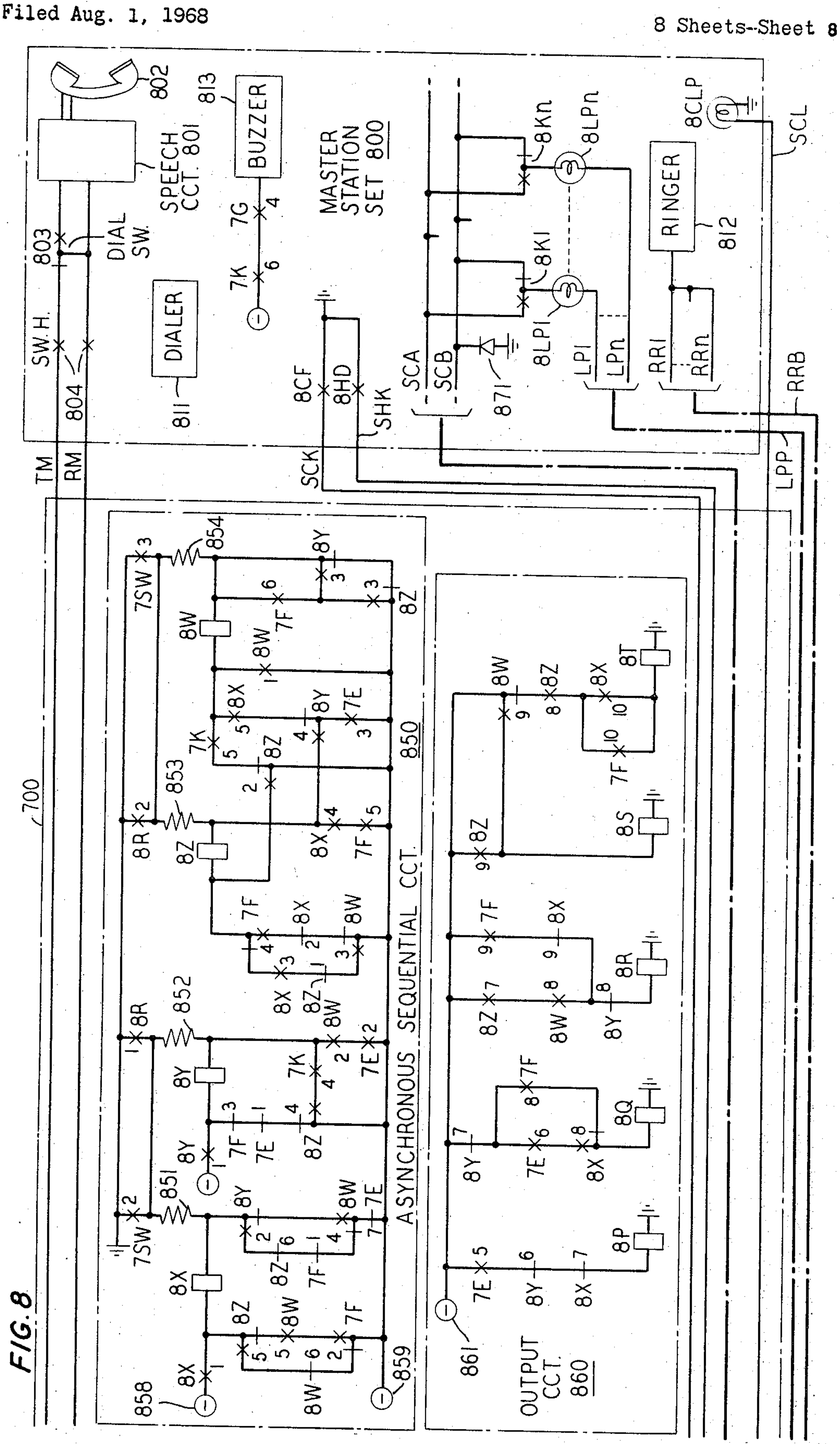

The conferencing arrangement described above is controlled by master station set 800 and its associated station circuit 700. Master station set 800 is connected to station circuit 700 via a talking path, including tip and ring conductors TM and RM, which terminates at set 800 in a conventional speech circuit 801 and handset 802. As shown in FIG. 8, tip and ring conductors TM and RM also include dial switch 803 and a pair of switch hook contacts 804. The switch hook contacts 804 are normally open, indicative of an on-hook condition, and contacts 804 close in conventional fashion when handset 802 is lifted from its cradle to go off-hook. Dial switch 803 is a transfer contact pair which operate repetitively in a conventional fashion during dialing operation by dialer 811, illustratively assumed to be a rotary dial.

Master station set 800 further comprises a plurality of keys including conference key 8CF, hold key 8HD, and station selection keys 8K1 through **8K*n*. Station selection keys 8K1 through 8K*n* individually provide for the selection of the lines associated with respective ones of station sets 2SS1 through 2SS*n*. Conference key 8CF provides for control of a conference call. Hold key 8HD provides for the usual service feature of holding one line while another line is seized for use. When hold key 8HD** is operated during a conference call, the conference connection is held.

In the audio and visual signaling portion of master station set 800, a ringer 812 and a buzzer 813 are provided along with lamps 8LP1 through 8LP*n* and 8CLP. Lamps 8LP1 through **8LP*n* are respectively associated with the lines selected by station selection keys 8K1 through 8K*n* and thus with respective station sets 2SS1 through 2SS*n*. Lamp 8CLP is associated with conference key 8CF and is lighted to indicate a conference call in progress. Buzzer 813 is provided, in addition to ringer 812, to provide a distinctive audible signal when master station set 800 attempts to select or add-on more stations to a conference than conference circuit 690 can accommodate. Alternatively, ringer 812** could be arranged to generate several distinct audible signals.

Station circuit 700 connects master station set 800 to link circuit 600 via the private link comprising tip and ring conductors TP and RP and to conference circuit 690 via tip and ring conductors TMC and RMC. Station circuit 700 contains logic circuitry for controlling the operation of the conferencing arrangement of FIGS. 2 through 8. This logic circuitry principally comprises asynchronous sequential circuit 850 and output circuit 860 responsive thereto. Station circuit 700 also includes hold signal generator 710, switch hook detector 740, station selection key detector 770, conference and hold key detector 790 and circuitry for providing appropriate conference lamp signals to master station set 800.

An alternating current signaling scheme is employed to reduce the number of leads required for the plurality of lamps and keys at master station set 800. Alternating signaling current is present on lamp leads LP1 through LP*n* at all times, provided, for example, by source 401, the magnitude of the signaling current being insufficient to light lamps 8LP1 through **8LP*n*. Each of keys 8K1 through 8K*n* has a diode 871 poled in one direction in series with the break portion of the key transfer contact and another diode 771 poled in the opposite direction in series with the make portion of the key transfer contact. When the key is in a released condition, half-cycles of alternating current thus flow in the corresponding lamp lead in one direction; and when the key is depressed, half-cycles of current flow in the other direction in the lamp lead. Station selection key detector 770 in station circuit 700 accordingly comprises a current detector to detect depression of one of keys 8K1 through 8K*n*, thereby operating key relay 7K. Similarly, station detector 4SD in subline circuit 4SL1, and the station detector in each of the other subline circuits, comprises a current detector to detect depression of the particular one of station selection keys 8K1 through 8K*n*** corresponding to the station set associated with the subline circuit.

CONFERENCE CALL

With the above description in mind, consider now the operation of the conferencing arrangement shown in FIGS. 2 through 8. Assume, for example, that the conferencing arrangement is idle and that master station set 800 desires to establish a conference call with two or more of station sets 2SS1 through **2SS*n*. When master station set 800 goes off-hook, closing switch hook contacts 804, current flows from source 741 over the loop including tip and ring conductors TM and RM, contacts 804 and speech circuit 801. This current flow is detected by switch hook detector 740 in station circuit 700, transistor 7Q1 being switched to a conducting state thereby and in turn switching transistor 7Q2 to a conducting state. Switch hook relay 7SW is energized via an obvious path through transistor 7Q2, operation of contacts 2 and 3 of relay 7SW extending ground to relays 8X, 8Y, 8W and 8Z to initiate operation of asynchronous sequential circuit 850**.

The operation of contact 2 of relay 7SW completes a path for energizing relay 8Y. This path may be traced from ground through contact 2 of relay 7SW, resistor 852, the coil of relay 8Y, break contact 3 of relay **7*f*, break contact 1 of relay 7E and the break portion of transfer contact 4 of relay 8Z to source 859. Contact 1 of relay 8Y** establishes a holding path for the relay.

When conference key 8CF is subsequently depressed, ground is extended therethrough over lead SCK to energize relay 7F via a path established to source 791 through operated contact 4 of switch hook relay 7SW. Energization of relay 7F, via operation of the make portion of transfer contact 4 thereof, completes a path for energizing relay 8Z. This path can be traced from ground through contact 3 of relay 7SW, resistor 853, the coil of relay 8Z, the make portion of transfer contact 4 of relay 7F, break contact 2 of relay 8X, and the break portion of transfer contact 3 of relay 8W to source 859. Operation of the make portion of transfer contact 2 of relay 8Z establishes an obvious holding path therefor. Operation of contact 9 of relay 8Z completes an obvious path to energize relay 8S in output circuit 860, contact 1 of relay 8S completing a path to energize conference relay 6CF in link circuit 600. Closure of contacts 1 through 5 of relay 6CF respectively connect vertical links SV1 through SV5 to corresponding ports of conference circuit 690. Relay 8T in output circuit 860 is also energized upon operation of make contact 8 of relay 8Z. The energization path for relay 8T is traced from source 861 through the break portion of transfer contact 9 of relay 8W, operated contact 8 of relay 8Z, operated contact 10 of relay 7F, and through the coil of relay 8T to ground. Operation of transfer contacts 1 and 2 of relay 8T connect tip and ring conductors TM and RM of master station set 800 to tip and ring conductors TMC and RMC extending to one port of conference circuit 690. At the same time, the operation of break contact 3 of relay 8T removes from conductors TMC and RMC the dummy load termination comprising resistor 721 and capacitor 722, and the operation of break contact 6 removes ground from conductor PVT to prevent operation of private link relays 6P1 through 6P6.

Conference lamp 8CLP at master station set 800 is lighted at this point as a visual signal that a conference call has been initiated. The appropriate steady lamp signal is provided over lead SCL to lamp 8CLP by lamp signal generator 689, over bus LPM to station circuit 700, through operated contact 5 of relay 8T, the break portion of transfer contact 3 of relay 8R, and break contact 3 of relay 7G.

Release of conference key 8CF removes ground from lead SCK, deenergizing relay 7F. Relay 8Z remains energized, however, by the above-mentioned holding path established by operation of transfer contact 2 of relay 8Z. Release of transfer contact 2 of relay 7F completes a path energizing relay 8X, this path being traced from source 859 through the break portion of transfer contact 2 of relay 7F, break contact 6 of relay 8W, the make portion of contact 5 of relay 8Z, the coil of relay 8X, resistor 851, contact 2 of relay 7W to ground. Relay 8X locks up to source 858 via operation of its contact 1. At this point, then, relays 8X, 8Y, 8Z, 8S and 8T are in an energized state, master station 800 is connected to conference circuit 690 via tip and ring conductors TMC and RMC, and conference lamp 8CLP is lighted.

ADD STATION TO CONFERENCE

Assume now that station selection key 8K1 is depressed to connect station set 2SS1 to the conference. Operation of key 8K1 reverses the current flow in lamp lead LP1 in the manner mentioned above, positive half-cycle current now flowing over the path from ground through diode 771 in station selection key detector 770, through the make portion of transfer contact 5 of relay 7SW, over lead SCA, through the make portion of the transfer contact for key 8K1, lamp 8LP1 (which is not lighted at this point, it will be recalled, since the signaling current is below the lamp lighting threshold), over lead LP1 and bus LPP to point 403 in station detector 4SD of subline circuit 4SL1, through diode 406 and resistor 402 to source 401. The positive current at point 403 is detected by station detector 4SD, switching transistor 4Q1 to a conducting state which, in turn, switches transistor 4Q2 to a conducting state, thereby operating relay 4M.

At the same time, the positive current in the above path is detected by station selection key detector 770, switching transistor 7Q7 to a conducting state which, in turn, extends the current therethrough to switch transistor 7Q8 to a conducting state, thereby operating relay 7K. Capacitor 773 maintains relay 7K operated between successive positive half-cycles of the signaling current on lead SCA. Make contact 4 of relay 7K operates to connect source 859 to the ground side of relay 8Y through the make portion of transfer contact 4 of relay 8Z, deenergizing relay 8Y.

Operation of transfer contact 1 of relay 4M completes a path to operate relay 4BE in flip-flop 4BB. This path is traced from source 421 through break contact 5 of relay 2H, the coil of relay 4BE, the make portion of transfer contact 1 of relay 4M, the break portion of transfer contact 1 of relay 4BL, diode 415, over lead SLD1 through break contact 5 of relay 7G to ground. Ground extended via the above traced path over lead SLD1 to relay 4BE is also extended thereby over lead SWG1 to horizontal link SN1 of switching network 500, and thus through the break portion of transfer contacts 1 of relays 5C1 through 5C6 and through the break portion of transfer contact 2 of relay 5C1 to one side of the coil of relay 5C1.

Operation of break contact 1 of relay 7K interrupts ring conductor RP to prevent operation of relay 7H6. Operation of make contact 2 of relay 7K extends ground over lead KEY through the break portion of transfer contact 1 of relay 6H1 to the base of transistor 6Q1 in link circuit 600, switching transistor 6Q1 to a conducting state. Transistor 6Q1 thus extends potential from source 641 therethrough over lead C11 of vertical link SV1 through the break portion of transfer contact 3 of relay 5C1 to the other side of the coil of relay 5C1.

Crosspoint relay 5C1 is accordingly energized via the ground extended by subline circuit 4SL1 over lead SWG1 to one side of relay 5C1 and the potential extended to the other side of relay 5C1 by transistor 6Q1 in link circuit 600. Energization of relay 5C1 busies the horizontal group of relays 5C1 through 5C6 via operation of the break portion of transfer contact 1 of relay 5C1 and connects the ground on lead SWG1 directly to relay 5C1 via operation of the make portion of transfer contact 2. Operation of transfer contact 1 of relay 5C1 also extends the ground on lead SWG1 through the make portion of the contact over lead C13 of vertical link SV1 to the base of transistor 6S1. Transistor 6S1 is thus switched to a conducting state, extending potential from source 661 therethrough over lead C12, through the make portion of transfer contact 3 of relay 5C1 to the coil of relay 5C1, thereby establishing a holding path for relay 5C1.

Operation of contacts 4, 5 and 6 of crosspoint relay 5C1 connects the tip and ring conductors and the signaling path, respectively, from subline circuit 4SL1 to leads C14, C15 and C16, respectively, of vertical link SV1. Leads C14 and C15 thus connect tip and ring conductors T11 and R12 from subline circuit 4SL1 over vertical link SV1 to tip and ring conductors TC1 and RC1 of one port of conference circuit 690. Lead C16 connects signaling paths SS11 and SS21 from subline circuit 4SL1 through the break portion of contact 2 of relay 6P1 and diode 611 over signaling lead SG1 to station circuit 700.

The operation of contacts 4 and 5 of crosspoint relay 5C1 also functions to complete a path energizing relay 6H1 in link circuit 600 via current in the tip and ring loop from line circuit 2LC1. This path may be traced from source 203 through the break portion of transfer contact 2 of relay 2H, over tip conductor T11, through operated contact 4 of relay 5C1, the break portion of transfer contact 3 of relay 6P1, the coil of relay 6H1, operated contact 1 of relay 6CF, the break portion of transfer contact 4 of relay 6P1 over lead C15, through operated contact 5 of relay 5C1, over ring conductor R12 through diode 433, over ring conductor R11 to ground. Current in the path just traced is also detected by supervisory circuit 4MS, switching transistor 4Q3 to a conducting state which, in turn, switches transistor 4Q4 to a conducting state, thereby operating supervisor relay 4S.

Current flowing in the above path is further detected by master station supervisory circuit 2MS in line circuit 2LC1, switching transistor 2Q3 to a conducting state to energize relays 2S2 and 2D. Operation of contact 2 of relay 2S2 completes a path connecting the ring signal from ring generator 688 to ringer 112 of station set 2SS1, this path being traced from ring generator 688 over lead RG through break contact 1 of relay 2C, the break portion of contact 3 of relay 2S1, operated contact 2 of relay 2S2 over lead RPL to ringer 112. At the same time, lamp 2LP1 is lighted with a flashing signal from lamp signal generator 689 to indicate the incoming call on the particular line. The path for lighting lamp 2LP in this manner is completed by the operation of transfer contact 3 of relay 2D, the flashing lamp signal path being traced therethrough from lamp signal generator 689 through the break portion of transfer contact 4 of relay 2S1, diode 303, over lead LPL to lamp 2LP1.

Master station set 800 is provided with a visual signal, indicating that set 2SS1 is being rung, via a steady lamp signal at lamp 8LP1. Lamp 8LP1 is lighted by a steady lamp signal from generator 689 over bus LP to line circuit 2LC1 through operated contact 5 of relay 2S2, the break portion of transfer contact 3 of relay 2H, the break portion of transfer contact 3 of relay 3CE, over lead L11, through the make portion of operated transfer contact 4 of relay 4BE, diode 407, over lead LP1 to lamp 8LP1.

The above-mentioned energization of relay 6H1 in link circuit 600 busies vertical link SV1 via operation of transfer contact 1 of relay 6H1, removing the connection of lead KEY from transistor 6Q1 of link SP1 and extending it to the next idle vertical link. Contact 2 or relay 6H1 removes the conference port load termination including resistor 631 and capacitor 632 from tip and ring conductors TC1 and RC1.

When station selection key 8K1, assumed to be nonlocking, is released the path over lead SCA to station selection key detector 770 is broken, thereby deenergizing relay 7K to remove ground from lead KEY. Release of station selection key 8K1 also returns the direction of current flow over lead LP1 to its normal negative state, deenergizing relay 4M in station detector 4SD. Release of transfer contact 2 of relay 4M completes a path through the break portion thereof and through operated contacts 2 and 3 of relay 4S for energizing relay 4BL in flip-flop 4BB.

Operation of other station selection keys at master station set 800 is similarly detected by the subline circuits associated with the station sets corresponding to the operated keys. In the manner described above, audible and visual signaling is extended by the corresponding line circuits to the associated station sets and visual signals are returned to master station set 800, lighting the lamps thereat associated with the individual selected station sets.

The connection of a station set to the conference is completed when the station set goes off-hook to answer the call. For example, when station set 2SS1 goes off-hook and depresses key 2K1, closing switch hook contacts 104 and contacts 1 and 2 of key 2K1, the usual tip and ring loop is completed from the station set to line circuit 2LC1. Current flowing in this loop from source 201 is detected by supervisory circuit 2SS, switching transistor 2Q1 to a conducting state to energize relays 2S1 and 2C. Break contact 2 of relay 2S1 operates to remove the load termination including resistor 211 and capacitor 212 from tip and ring conductors T1 and R1. Operation of break contact 1 of relay 2C interrupts the connection between lead RPL and lead RG from ring generator 688, terminating the ringing signal at station set 2SS1. Operation of transfer contact 4 of relay 2S1 terminates the flashing lamp signal and extends a steady lamp signal over lead LPL to lamp 2LP1. Station set 2SS1 is, at this point, connected to conference circuit 690 and can communicate with master station set 800 and with any other station sets connected to conference circuit 690.

Subsequently, additional ones of station sets 2SS1 through 2SS$n$ can be added to the conference at any time by master station set 800, up to the total capacity of conference circuit 690, by simply operating the particular station selection keys 8K1 through 8K$n$ associated with the additional station sets. The capacity of the illustrative conference circuit 690 shown in FIG. 6 is five station sets and master station set 800. Assume, for example, that station sets are connected to each port of conference circuit 690 except for the port connected to tip and ring conductors TC5 and RC5. If master station set 800 operates a station selection key associated with a station not already a party to the conference, that station will be signaled and connected through switching network 500 over vertical link SV5 to tip and ring conductors TC5 and RC5 in the manner described above.

Should master station set 800, in error, attempt to exceed the capacity of conference circuit 690 by operating an additional station selection key when the conference is full, buzzer 813 will sound and conference lamp 8CLP will exhibit a flashing signal as an indication of the error. Specifically, when conference circuit 690 is full, all of relays 6H1 through 6H5 will be operated, contacts 3 thereof completing a path over lead ALB through operated contact 4 of relay 8T to energize relay 7G. Operated contact 4 of relay 7G and contact 6 of relay 7K, operated in the manner described above when the additional station selection key is depressed, complete a path energizing buzzer 813. Operated contact 2 of relay 7G and the make portion of transfer contact 3 of relay 7K extend the flashing lamp signal over lead SCL to conference lamp 8CLP, the steady lamp signal thereto being interrupted by the operation of break contact 3 of relay 7G and the break portion of transfer contact 3 of relay 7K. Break contact 5 of relay 7G operates to prevent the usual extension of ground to switching network 500 by the subline circuit associated with the station set corresponding to the operated station selection key. When the station selection key is released, relay 7K is deenergized, in turn deenergizing buzzer 813 and returning the steady lamp signal to conference lamp 8CLP.

DROP STATION FROM CONFERENCE

Once a station set is connected to conference circuit 690 it can be individually dropped from the conference without disturbing the remaining conference connection by operating the associated station selection key a second time. By way of illustration, assume that master station set 800 desires to drop station set 2SS1 from the conference. When station selection key 8K1 is depressed, current is reversed in lead LP1 and is detected by station detector 4SD in subline circuit 4SL1, energizing relay 4M. Transfer contact 1 of relay 4M operates, the break portion thereof interrupting the ground path for relay 4BE in flip-flop 4BB and removing ground from lead SWG1 to switching network 500. Relay 4BE releases. Termination of the ground on lead SWG1 releases relay 5C1, disconnecting tip and ring conductors T11 and R12 from vertical link SV1, and thus from tip and ring conductors TC1 and RC1 to conference circuit 690.

Consequently, relay 6H1 in link circuit 600 releases, transfer contact 1 thereof returning vertical link SV1 to an idle state and contact 2 connecting the dummy load termination across tip and ring conductors TC1 and RC1. Supervisory circuit 4MS in subline circuit 4SL1 detects the disconnect of conductors T11 and R12, the cessation of loop current releasing relay 4S. The cessation of loop current is similarly detected by supervisory circuit 2MS in line circuit 2LC1, releasing relay 2S2. Release of contact 5 of relay 2S2 interrupts the lamp signal over leads L11 and LP1 to lamp 8LP1, extinguishing lamp 8LP1 at master station set 800.

When key 8K1 at master station set 800 is released, relay 4M is deenergized, release of transfer contact 2 thereof deenergizing relay 4BL in flip-flop 4BB, returning subline circuit 4SL1 to its normal idle state. If station set 2SS1 then goes on-hook, releasing switch hook contacts 104, relays 2S1, 2C and 2D are deenergized to return line circuit 2LC1 to its normal idle state, release of transfer contact 4 of relay 2S1 extinguishing lamp 2LP1.

TERMINATION OF CONFERENCE CALL

Alternatively, of course, the entire conference call can be dropped by master station set 800 going on-hook, releasing switch hook contacts 804 to deenergize switch hook detector relay 7SW. Release of contacts 2 and 3 of relay 7SW break the ground paths for relays 8X and 8Z, deenergizing relays 8X and 8Z to return asynchronous sequential circuit 850 to an idle state. Release of contacts 8 and 9 of relay 8Z, in turn, deenergizes relays 8S and 8T to return output circuit 860 to an idle state. Release of relay 8T, via its contacts 1, 2 and 3, disconnects master station set tip and ring conductors TM and RM from tip and ring conductors TMC and RMC to conference circuit 690 and connects loads 721 and 722 across conductors TMC and RMC.

Release of contact 1 of relay 8S deenergizes conference relay 6CF in link circuit 600, release of contacts 1 through 5 of relay 6CF interruping the respective tip and ring loops to conference circuit 690, thereby deenergizing relays 6H1 through 6H5. Deenergization of relays 6H1 through 6H5 returns links SV1 through SV5 to an idle state via contacts 1, and connects the dummy load terminations across the respective conference ports via release of contacts 2.

Interruption of the tip and ring loops to conference circuit 690 is detected by the supervisory circuits in the subline circuits, such as supervisory circuit 4MS in subline circuit 4SL1, deenergizing respective supervisory relays 4S. Release of contacts 1 and 2 of relays 4S deenergizes relays 4BE and 4BL and removes ground from leads SWG1 through SWG*n* to switching network 500. Thus, any operated ones of crosspoint relays 5C1 through 5C*m* are deenergized to return switching network 500 to an idle state.

Interruption of the tip and ring loops to conference circuit 690 is also detected by the master station supervisory circuits in the various line circuits, such as supervisory circuit 2MS in line circuit 2LC1, deenergizing respective relays 2S2. This interrupts the lamp signals over leads LP1 through LP*n* to extinguish any lighten ones of lamps 8LP1 through 8LP*n* at master station set 800. Conference lamp 8CLP at set 800 is extinguished by release of contact 5 of relay 8T.

Master station set 800 can also drop the conference without going on-hook by depressing conference key 8CF a second time. This extends ground over lead SCK to energize relay 7F, contact 5 of relay 7F operating to deenergize relay 8Z by connecting source 859 through operated contact 4 of relay 8X to the ground side of relay 8Z. Release of contact 9 of relay 8Z deenergizes relay 8S, release of contact 1 of relay 8S deenergizing conference relay 6CF. The operation of the conferencing system then proceeds in substantially the same manner as described above to break down the various conference call connections, leaving master station set 800 connected to private link tip and ring conductors TP and RP.

Since master station set 800 is off-hook, switch hook detector relay 7SW remains operated. Thus, when conference key 8CF is released, deenergizing relay 7F, break contact 3 of relay 7F releases to complete a path energizing relay 8Y. This path may be traced from source 859 through the break portion of transfer contact 4 of relay 8Z, contact 1 of relay 7E, contact 3 of relay 7F, the coil of relay 8Y, resistor 852 and contact 2 of relay 7SW to ground. Transfer contact 2 of relay 8Y operates, in turn, deenergizing relay 8X by connecting source 859 to the ground side of relay 8X through break contact 7 of relay 7E, through the break portion of transfer contact 4 of relay 8W, contact 1 of relay 7F and contact 6 of relay 8Z. At this point, then, it will be recognized that the conferencing system is in substantially the same state as when master station set 800 initially went off-hook, permitting master station set 800 to initiate a new conference call or a private call, as he wishes.

CONFERENCE HOLD

If, on the other hand, it is assumed that the conference call is still in progress and that master station set 800 wishes to place the conference call on HOLD, this is effected by depressing and releasing hold key 8HD. When hold key 8HD is depressed, ground is extended over lead SHK to conference and hold key detector 790, energizing relay 7E over a path to source 781 through operated contact 4 of relay 7SW. Contact 3 of relay 7E operates to energize relay 8W in asynchronous sequential circuit 850 via a path completed from source 859 through the break portion of transfer contact 4 of relay 8Y, operated contact 5 of relay 8X, the coil of relay 8W, resistor 854, contact 3 of relay 7SW to ground. Contacts 8 and 9 of relay 8W operate, in turn, to energize relay 8R and deenergize relay 8T, respectively, in output circuit 860. The path for energizing relay 8R is traced from source 861 through operated contact 7 of relay 8Z, operated contact 8 of relay 8W and break contact 8 of relay 8Y.

Release of contacts 1, 2 and 3 of relay 8T disconnects master station set tip and ring conductors TM and RM from conference circuit 690 and connects load 721 across conference circuit tip and ring conductors TMC and RMC. Master station set tip and ring conductors TM and RM are extended through the break portions of transfer contacts 1 and 2 of relay 8T to private link tip and ring conductors TP and RP. At the same time, operation of transfer contact 3 of relay 8R removes the steady lamp signal from conference lamp 8CLP and extends thereto over lead SCL through the break portion of transfer contact 3 of relay 7K, a winking lamp signal as a visual indication that the conference call is on HOLD.

Relay 8Q is energized in output circuit 860 by the operation of contact 6 of relay 7E, which completes a path between relay 8Q and source 861 through break contact 7 of relay 8Y and the make portion of transfer contact 8 of relay 8X. Contacts 1 through 5 of relay 8Q in hold signal generator 710 operate to complete a path to ground for positive half-cycles of current on leads SG1 through SG5, respectively. This provides a conference hold indication to the particular line circuits associated with the station sets connected to the conference. Thus, for example, a path is completed for positive half-cycles of current from source 251 over lead SS21 through diode D21, operated contact 6 of relay 5C1, lead C16 of vertical link SV1, the break portion of transfer contact 2 of relay 6P1, diode 611, lead SG1, operated contact 1 of relay 8Q, diode 711 to ground. Positive current flowing in this path is detected by conference hold detector 2CHD in line circuit 2LC1, switching transistors 2Q5 and 2Q6 to a conducting state to energize relay 2P.

Contact 1 of relay 2P completes an obvious path through the break portion of transfer contact 1 of relay 3CE to energize relay 3CE in conference hold flip-flop 3CH. Relay 3CE locks up through the make portion of its transfer contact 1. Transfer contact 3 of relay 3CE operates to terminate the steady lamp signal on lead L11 and extends a winking lamp signal over lead L11 and lead LP1 to lamp 8LP1 at master station set 800.

Accordingly, when master station set 800 places a conference call on HOLD by depressing hold key 8HD, a visual indication thereof is provided by winking lamp signals at conference lamp 8CLP and at each of the lamps corresponding to station sets connected to the conference, such as lamp 8LP1, in the manner described above. Release of hold key 8HD deenergizes relay 7E which, in turn, via release of contacts 6 and 7, respectively, deenergizes relays 8Q and 8X. Deenergization of relay 8Q disconnects ground from leads SG1 through SG5, thereby releasing conference hold detector relays 2P at the line circuits. Release of contact 1 of relay 2P permits relay 3CL to operate over a path traced from ground through the make portion of transfer contact 1 of relay 3CE.

PRIVATE LINK CALL

While the conference call is on HOLD, master station set 800 can, if he wishes, consult privately with another station set via private link tip and ring conductors TP and RP. For example, if master station set 800 wishes to consult privately with one of station sets 2SS1 through 2SS*n*, operation of the corresponding station selection key 8K1 through 8K*n* effects interconnection of the particular station set over an idle one of vertical links SV1 through SV5 and SVP to private link tip and ring conductors TP and RP in a manner similar to that described above.

Assume for the purposes of illustration that a conference call is on HOLD, that the conference is full and thus that vertical links SV1 through SV5 are busy, and assume further that station set 2SS1 is not connected to the conference but that master station set 800 wishes to consult privately with set 2SS1. When key 8K1 is depressed, relay 7K in station selection key detector 770 is energized, and relay 4M in station detector 4SD of subline circuit 4SL1 is energized, in the manner described above. Operation of transfer contact 1 of relay 4M energizes relay 4BE and extends ground over lead SWG1 and horizontal link SN1 to switching network 500. The ground on lead SWG1 is thus extended through transfer contacts 1 to one side of each of relays 5C1 through 5C6. At the same time, contact 2 of relay 7K extends ground over lead KEY, through operated transfer contacts 1 of relays 6H1 through 6H5, over lead ALM, through break contact 1 of relay 7H6, over lead PM, to the base of transistor 6Q6. Transistor 6Q6 is switched thereby to a conducting state, extending potential source 646 therethrough over lead C61 to the other side of crosspoint relay 5C6. Crosspoint relay 5C6 is thus energized to connect tip and ring conductors T11 and R12 to leads C64 and C65 of vertical link SVP.

Conduction of transistor 6Q6 also completes a path energizing relay 6P6, this path being traced from source 646 through transistor 6Q6, the break portion of transfer contact 1 of relay 6P6, the coil of relay 6P6, over lead PBT, through operated contact 4 of relay 8R to ground. Contacts 2 and 3 of relay 6P6 operate to connect leads C64 and C65 to private link tip and ring conductors TP and RP. Transfer contact 1 of relay 6P6 operates to complete a holding path for relay 6P6 through transistor 6S6, which is switched conducting by the ground on lead SWG1 over lead C63.

This completes the tip and ring loop to line circuit 2LC1, energizing relays 4S, 2S2 and 2D in the manner described above to provide ringing and visual signaling to station set 2SS1 and to provide a visual signal at lamp 8LP1 of set 800. Completion of this loop also operates relay 7H6 in station circuit 700, contact 1 thereof interrupting the ground path over lead PM to the base of transistor 6Q6. Release of key 8K1 at set 800 denergizes relays 7K and 4M and energizes relay 4BL, as described above, and when station set 2SS1 goes off-hook on the line to answer the call. Relays 2S1 and 2C are energized to terminate ringing and to change the visual signal appropriately at lamp 2LP1 of set 2SS1.

It will be apparent that if station set 2SS1 is a party to the conference on HOLD when key 8K1 at set 800 is operated, station set 2SS1 will be dropped from the conference in substantially the same manner as described above for dropping a station from the conference. Release of break contact 6 of relay 2S2 completes a path through contact 4 of relay 2D, grounding the battery side of relay 3CE, deenergizing relay 3CE to terminate the hold signal at lamp 8LP1. Operating key 8K1 again connects station set 2SS1 to master station set 800 over the private link in the manner just described.

PRIVATE LINK HOLD

Subsequently, master station set 800 can place the private link call to station set 2SS1 on HOLD while returning to the conference call or while consulting privately with another station set over the private link. This is effected by depressing hold key 8HD, extending ground over lead SHK to energize relay 7E. Contact 5 of relay 7E operates to complete an obvious path through break contacts of relays 8X and 8Y to energize relay 8P. Contacts 1 through 6 of relay 8P in hold signal generator 710 operate to complete a path to ground for negative half-cycles of current on leads SG1 through SG6, respectively. This provides a hold indication over lead SG6 to line circuit 2LC1 associated with set 2SS1. Specifically, a path is completed for negative half-cycles of current from source 251 over lead SS11 through diode D11, operated contact 6 of relay 5C6, lead C66 of vertical link SV6, operated contact 4 of relay 6P6, lead SG6, operated contact 6 of relay 8P, diode 716 to ground. Negative current flowing in this path is detected by hold detector 2HD in line circuit 2LC1, switching transistors 2Q2 and 2Q4 to a conducting state to energize hold relay 2H.

Contact 1 of relay 2H completes a holding path for relay 2H through diode 262 to source 261. Transfer contact 2 of relay 2H interrupts the tip and ring loop to master station set 800 and connects holding bridge 210 thereacross for set 2SS1.

When the tip and ring loop to master station set 800 is interrupted by operation of transfer contact 2 of hold relay 2H, loop current ceases and supervisory relay 4S and relay 7H6 are deenergized. Deenergization of relay 4S, in turn, deenergizes relays 4BE and 4BL, terminating the ground on lead SWG1 to switching network 500. Consequently, relays 5C6 and 6P6 release, disconnecting tip and ring conductors T11 and R12 from vertical link SVP and disconnecting vertical link SVP from private link tip and ring conductors TP and RP.

Release of hold key 8HD deenergizes relay 7E which, via release of contact 5 thereof, deenergizes relay 8P. A visual indication is provided to master station set 800 that station set 2SS1 is on private hold by the release of transfer contact 4 of relay 4BE. In combination with the operation of transfer contact 4 of hold relay 2H, this terminates the steady lamp signal to lamp 8LP1 and extends thereto a flutter lamp signal, the path therefor being traced through the make portion of transfer contact 4 of relay 2S2, operated contact 5 of relay 2S1, the make portion of transfer contact 4 of relay 2H, the break portion of transfer contact 2 of relay 3CE over lead L21, through the break portion of transfer contact 4 of relay 4BE and over lead LP1 to lamp 8LP1 at set 800.

Station set 2SS1 can be removed from HOLD and reconnected to the private link by operation of key 8K1 at set 800. Operation of key 8K1 effects connection of set 2SS1 to the private link in the manner described above. When key 8K1 is depressed, energizing relay 4M and 4BE in subline circuit 4SL1, contact 3 of relay 4M grounds the battery side of hold relay 2H, deenergizing relay 2H to remove the hold bridge from the tip and ring conductors T11 and R11 and to return the steady lamp signal to lamp 8LP1.

Should one of the station sets go on-hook while being held, whether on a conference call or on a private call from set 800, relay 2S1 is deenergized. Break contact 6 of relay 2S1 releases to extend ground through operated contact 3 of relay 2C to the battery side of relays 2H, 4S and 3CE, deenergizing whichever relays are energized. Release of transfer contact 4 of relay 2H or of transfer contact 3 of relay 3CE, depending upon whether private hold or conference hold, terminates the corresponding hold signal to the lamp at master station set 800 associated with the particular station set. If the station set is on conference hold, deenergization of relay 4S deenergizes relays 4BE and 4BL and terminates the ground on lead SWG1 to switching network 500. Thus the connection to the conference is broken and the particular vertical link is idled in the manner previously described.

A station set is dropped from the private link, in the same manner as described above for dropping a station set from a conference, by operating the corresponding station selection key again. When the station selection key is operated, relay 4M in the associated subline circuit is energized to remove the holding ground from the appropriate crosspoint relay in switching network 500. The crosspoint relay is thus deenergized to break the tip and ring connection, deenergizing supervisory relays 4S and 2S2 in the subline and line circuits associated with the particular station set. The lamp signal to the appropriate station set lamp at master station set 800 is terminated and link circuit 600 idles the particular vertical link to which the station set was connected.

Alternatively, master station set 800 can terminate the private link call connection in the usual manner by going on-hook. If set 800 goes on-hook, asynchronous sequential circuit 850 is maintained operated by contacts 1 and 2 of relay 8R to maintain the conference on HOLD.

When master station set wishes to return to the conference, this is effected by simply operating conference key 8CF again. Operation of key 8CF extends ground over lead SCK to energize relay 7F, contact 6 thereof operating to deenergize relay 8W by connecting source 859 to the ground side of relay 8W through the make portion of transfer contact 3 of relay 8Z. Contact 8 of relay 7F energizes relay 8Q via an obvious path through break contact 7 of relay 8Y and the break portion of transfer contact 8 of relay 8X. Relay 8Q, in turn, extends ground over leads SG1 through SG5 to energize relays 2P in the line circuits associated with the station sets connected to the conference. This releases relay 3CE in each line circuit conference hold flip-flop 3CH, transfer contact 3 thereof releasing to return a steady lamp signal to the lamps at set 800 corresponding to the station sets connected to the conference.

Release of relay 8W, via the break portion of its transfer contact 9, completes a path through contact 8 of relay 8Z and contact 10 of relay 7F to energize relay 8T. Contacts 1, 2 and 3 of relay 8T operate to connect master station set tip and ring conductors TM and RM to conference circuit tip and ring conductors TMC and RMC, and to disconnect the dummy load termination from conductors TMC and RMC. When conference key 8CF is released, releasing relay 7F, relay 8X is energized and relays 8P and 8R are deenergized. The path for energizing relay 8X is completed by the release of contact 1 of relay 7F and relays 8P and 8R are deenergized by release of contacts 7 and 9, respectively, of relay 7F. Contact 10 of relay 8X provides an alternate path for holding relay 8T energized when contact 10 of relay 7F releases. Release of transfer contact 3 of relay 8R terminates the winking lamp signal on lead SCL and returns the steady lamp signal through operated contact 5 of relay 8T over lead SCL to conference lamp 8CLP. Release of contact 1 of relay 8P removes ground from leads SG1 through SG5, deenergizing line circuit conference hold detector relays 2P, thereby deenergizing conference hold flip-flop relays 3CL in the line circuits.

Finally, consider briefly the operation when there is no conference call in progress and master station set 800 goes off-hook and places a private link call. The operation of switch hook contacts 804 energizes relay 7SW, contact 2 operating to energize relay 8Y in asynchronous sequential circuit 850. Assuming that the private link call is to station set 2SS1, key 8K1 is depressed energizing relays 7K and 4M, contact 5 of relay 7K operating to energize relay 8W in asynchronous sequential circuit 850. Transfer contact 9 of relay 8W operates to energize relay 8S in output circuit 860.

Contact 2 of relay 7K extends ground over lead KEY to the base of transistor 6Q1, switching transistor 6Q1 to a conducting state. Conduction of transistor 6Q1 extends potential source 641 to one side of relays 6P1 and 5C1 over obvious paths. Ground is extended to the other side of relay 6P1 through break contact 6 of relay 8T over path PVT, energizing relay 6P1. Ground is extended to the other side of relay 5C1 over lead SWG1 by the operation of relay 4M and, in turn, relay 4BE.

The operation of relays 6P1 and 5C1 connects tip and ring conductors T11 and R12 to vertical link SV1 and connects vertical lead SV1 to private link tip and ring conductors TP and RP. Completion of this tip and ring loop between master station set 800 and line circuit 2LC1 energizes relays 4S, 2S2 and 2D in the manner described above, thereby ringing station set 2SS1 and providing a flashing signal to lamp 2LP1 and a steady signal to lamp 8LP1 in set 800. Release of key 8K1 deenergizes relays 7K and 4M and energizes relay 4BL. When station set 2SS1 goes off-hook on tip and ring conductors T1 and R1 to answer the call, relays 2S1 and 2C operate to terminate ringing and change the visual signal at lamp 2LP1 to steady.

The private link call to station set 2SS1 can, of course, be subsequently placed on HOLD by operation of hold key 8HD, or it can be terminated by operating key 8K1 again, or by master station set 800 or station set 2SS1 going on-hook. If hold key 8HD is operated, relay 7E is energized in the usual manner, energizing relays 8P and 2H to effect disconnect of station set 2SS1 from the private link and to connect hold bridge 210 across tip and ring conductors T11 and R11. Contact 2 of relay 7E operates to deenergize relay 8Y, transfer contact 3 thereof operating to deenergize relay 8W, returning asynchronous sequential circuit 850 to an idle state. However, when hold key 8HD is released, deenergizing relay 7E, break contact 1 of relay 7E releases energizing relay 8Y via a previous traced path. At the same time, relay 7K is operated momentarily to energize relay 8W thus returning asynchronous sequential circuit 850 to the proper state for private link hold.

The momentary operation of relay 7K is accomplished for this purpose by transistors 7Q5, 7Q6, and 7Q9 and capacitor 795. When lead SHK is grounded by operation of hold key 8HD, capacitor 795 charges to potential source 792 and transistor 7Q6 is switched to a conducting state. When the ground is removed from hold key 8HD, transistor 7Q6 is maintained conducting by charged capacitor 795 and normally-conducting transistor 7Q5 is switched to a non-conducting state. The switching of transistor 795 to a nonconducting state switches transistor 7Q9 to a conducting state, thereby energizing relay 7K. When capacitor 795 discharges so as to no longer maintain transistor 7Q6 conducting, transistor 7Q5 returns to its normally conducting state, switching transistor 7Q9 to a nonconductive state to deenergize relay 7K.

It is to be understood that the above-described arrangement is merely illustrative of the application of the principles of the present invention. Numerous other arrangements may be devised by those skilled in the art without departing from the spirit and scope of the invention.

What is claimed is:

1. In a telephone switching system, the combination comprising, a plurality of telephone lines, a subscriber station having a key field in which said keys correspond to individual ones of said lines, a subscriber station private line, switching means, a conference circuit having an input port and a plurality of output ports, conferencing means for establishing a connection between said station and said input port, and means including said conferencing means for operating said switching means responsive to a first operation of one of said keys to selectively connect the corresponding one of said lines to one of said output ports and responsive to a second operation of said one key to disconnect the corresponding line from said one output port.

2. The combination in accordance with claim 1 further comprising means for disconnecting said station from said input port and for holding said conference circuit output port connections.

3. The combination in accordance with claim 2 further comprising means for operating said switching means to establish a connection over said subscriber station private line to one of said telephone lines while holding said conference circuit output port connections.

4. The combination in accordance with claim 1 wherein said subscriber station includes a conference key and wherein said conferencing means includes means responsive to the operation of said conference key for establishing a connection from said station to said input port of said conference circuit.

5. The combination in accordance with claim 4 wherein said subscriber station further includes a hold key, the combination further comprising means responsive to the operation of said hold key for disconnecting said station from said input port of said conference circuit and for holding said conference circuit output port connections.

6. The combination in accordance with claim 5 further comprising means responsive to the operation of one of said keys in said key field subsequent to the operation of said conference key and said hold key for operating said switching means to establish a connection over said subscriber station private line to the telephone line corresponding to said one operated key while holding said conference circuit output port connections.

7. The combination in accordance with claim 4 further comprising signaling means at said station, conference full indicating means operative in response to the connection of telephone lines to each of said output ports of said conference circuit, and means responsive to the operation of said conference full indicating means and the operation of one of said keys in said key field corresponding to a line not connected to one of said output ports for operating said signaling means.

8. The combination in accordance with claim 7 further comprising means responsive to the operation of said conference full indicating means for preventing the operation of said switching means.

9. The combination in accordance with claim 8 wherein said subscriber station further includes a hold key, the combination further comprising means responsive to the operation of said hold key for disconnecting said station from said input port of said conference circuit and for holding said conference circuit output port connections.

10. The combination in accordance with claim 9 further comprising means responsive to the operation of said hold key for inhibiting the operation of said conference full indicating means.

11. A conferencing system comprising, a switching network having a plurality of input and output paths, a plurality of telephone lines individually connected to respective ones of said input paths, a telephone station set having a key field in which said keys are representative of individual ones of said lines, a private link connected to said station set, control means including said switching network responsive to the operation of one of said keys to connect the corresponding one of said lines to said private link, a conference circuit having an input port and a plurality of output ports, conferencing means for disconnecting said station set from said private link and for connecting said station set to said input port, and means including said conferencing means and said switching network responsive to a first operation of one of said keys to connect the corresponding one of said lines over one of said output paths to one of said conference circuit output ports and responsive to a second operation of said one key to disconnect the corresponding line from said one output port.

12. A conferencing system in accordance with claim 11 further comprising means controlled by said station set for disconnecting said station set from said input port while holding said conference circuit output port connections.

13. A conference system in accordance with claim 12 further comprising means including said control means for connecting said station set to one of said telephone lines over said private link while holding said conference circuit output port connections.

References Cited

UNITED STATES PATENTS 3,423,532 1/1969 Coel et al. ---------- 179—18

KATHLEEN H. CLAFFY, Primary Examiner

D. L. STEWART, Assistant Examiner

U.S. Cl. X.R.

179—27